US008668340B2

(12) United States Patent
Jordanov et al.

(10) Patent No.: US 8,668,340 B2
(45) Date of Patent: Mar. 11, 2014

(54) REFLECTIVE MEDICAL MARKERS AND METHODS OF MANUFACTURE

(76) Inventors: Jordan Danchov Jordanov, Sofia (BG); Dancho Iliev Jordanov, Sofia (BG)

( * ) Notice: Subject to any disclaimer, the term of this patent is extended or adjusted under 35 U.S.C. 154(b) by 284 days.

(21) Appl. No.: 13/098,484

(22) Filed: May 2, 2011

(65) Prior Publication Data

US 2012/0281283 A1    Nov. 8, 2012

(51) Int. Cl.
    *G02B 5/12*    (2006.01)
(52) U.S. Cl.
    USPC .......................................... 359/515; 359/900
(58) Field of Classification Search
    USPC .................................. 359/515–533
    See application file for complete search history.

(56) References Cited

U.S. PATENT DOCUMENTS

| 4,152,046 | A  | * | 5/1979  | Knapp ........................ 359/514 |
| 4,466,698 | A  | * | 8/1984  | Gantz ............................. 116/18 |
| 6,120,636 | A  | * | 9/2000  | Nilsen et al. .................. 156/230 |
| 6,127,020 | A  | * | 10/2000 | Bacon et al. .................. 428/161 |
| 6,760,157 | B1 | * | 7/2004  | Allen et al. ............... 359/487.02 |
| 7,874,686 | B2 | * | 1/2011  | Rossner et al. .............. 359/515 |
| 8,235,537 | B2 | * | 8/2012  | Glembocki et al. .......... 359/529 |

* cited by examiner

*Primary Examiner* — Frank Font
(74) *Attorney, Agent, or Firm* — Steven A. Nielsen; Allman & Nielsen, P.C.

(57) ABSTRACT

Identical plastic hemispheres are first treated with organic solvent, which is smeared by a pillow of microporous silicon rubber to achieve a slippery surface upon the hemispheres. The slippery surface upon the hemispheres may comprise a layer of melted plastic. Hemispheres are then placed under an application chamber, where hot gas under pressure softens, deforms and transports a sheet of marker foil over the hemisphere. Two hemispheres are then joined together by use of asymmetric voids and a clip pin inserted, while under compression, into the hemispheres.

5 Claims, 7 Drawing Sheets

US 8,668,340 B2

REFLECTIVE MEDICAL MARKERS AND METHODS OF MANUFACTURE

BACKGROUND OF THE INVENTION (1) Field of the Invention

The invention generally relates to reflective medical markers and means of manufacture. More particularly, embodiments of the invention relate to the construction and attachment of retro reflective hemispheres.

(2) Description of the Related Art

Other reflective markers and means of making reflective markers are known in the related art. For example, U.S. Pat. No. 7,874,686 issued on Jan. 25, 2011 by Rossner et al discloses a complicated, error prone, an costly method of applying a reflective substance within an inner body of a marker. The theory behind Rossner is that the application of internal marking materials obviates the need to deal with rough outer surfaces. Thus, there is room in the art for means and methods of constructing markers suitable for external reflective material and there is a need in the art for new means of externally applying reflective material.

Other markers are known to be externally coated in reflective dust and paint. Such markers present shortfalls in the art as such markers have inherently rough external surfaces, lose their symmetry in the coating process and have unpredictable centers of gravity. Thus, the motivation of Rossner to eschew external coatings is understandable.

BRIEF SUMMARY OF THE INVENTION

The present invention overcomes shortfalls in the related art by presenting unobvious and unique combinations, configurations and uses of materials and methods to create hemispheres that are efficiently covered with external reflective material and wherein such hemispheres are nearly seamlessly joined to create balanced and smooth spherical markers. The disclosed means and methods have achieved unexpected results in producing superior markers with enhanced reflective properties and smooth exterior surfaces. The disclosed means and methods also produce unexpected efficiencies in the manufacturing process. The current state of the known art, Rossner, teaches away from the use or manufacture of external coating procedures, fearing that surface irregularities prevent an even application of external coating material and fearing that the external coatings themselves will present a rough exterior surface. The disclosed embodiments and methods present a clear and unexpected departure from the prior art preference of internally marking medical markers.

Embodiments of the disclosed invention include the construction of hemispheres that are specially prepared and evenly coated with an adhesive to accept the application of a heated foil sheet applied within a specialized chamber of pressurized gas. The chamber and gas system soften the reflective foil causing the reflective foil to seamlessly and evenly adhere to the hemisphere. Two of the coated hemispheres, which are identical at this point of the process, are then joined together using a specialized central pin. In some embodiments, an exposed void is presented with internal treads.

REFERENCE NUMERALS IN THE DRAWINGS

Figure 1:
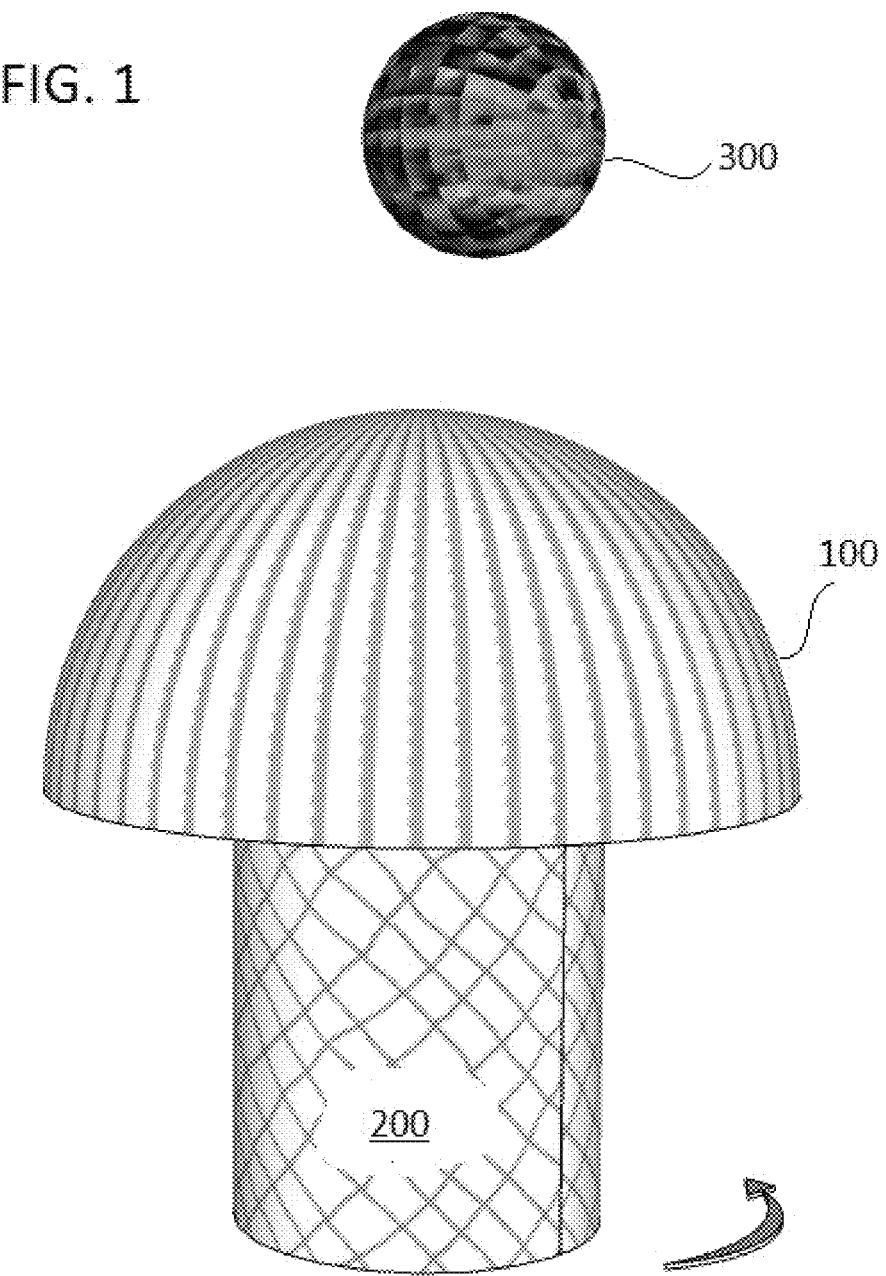
FIG. 1 is a perspective view of an uncoated hemisphere mounted upon a spinning mandrel with a drop of organic solvent falling upon the hemisphere.

- 100 is a hemisphere with an untreated surface.
- 110 is a void sometimes found within a spherical maker 150.
- 105 is a bottom or left hand hemisphere sometimes attached to a top or right hand hemisphere 106 by use of a clip pin 112.
- 106 is a right hand hemisphere or top hemisphere sometimes featuring a top collar 111.
- 111 is a top collar section of a clip pin 112. The top collar may be the outermost external surface of a clip pin 112.
- 112 is a clip pin, sometimes used to attach or connect a bottom hemisphere 105 to a top hemisphere 106.
- 113 is the inside surface of a clip pin 113. The inside surface 113 sometimes features threads to allow for a spherical marker 150 to be attached to other objects.
- 150 is one embodiment of a disclosed spherical marker.
- 200 is a mandrel, sometimes used to rotate a hemisphere, such as in the application of a solvent or in rubbing or cleaning the hemisphere.
- 300 is a quantity of organic solvent. In the best mode known to date, one drop of organic solvent is used with each hemisphere.
- 400 is a bar, pillow or other configuration of microphorous silicone rubber, sometimes used to smear the organic solvent 300 upon the hemisphere 100.
- 500 is an application chamber sometimes used to heat and apply a sheet of marking foil upon a hemisphere.
- 501 is a void sometimes used to introduce pressurized gas into the application chamber 500.
- 502 is a lower frame, sometimes used to secure a sheet of marking foil prior to application of the marking foil upon a hemisphere.
- 600 is a sheet of marking foil material that is sometimes heated and smoothly applied to the surface of a hemisphere 100.

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Referring to FIG. 1 a raw hemisphere 100 is shown mounted upon a mandrel 200 or other tool of rotation. In this drawing, the hemisphere is shown with hatching to denote a relatively rough exterior surface. A drop of organic solvent 300 is shown falling upon the hemisphere. A directional arrow shown near the mandrel 200 suggests that the hemisphere may be rotated during the application of the organic solvent 300. In the preferred embodiment, the hemisphere is rotating when the organic solvent is applied.

Figure 2:
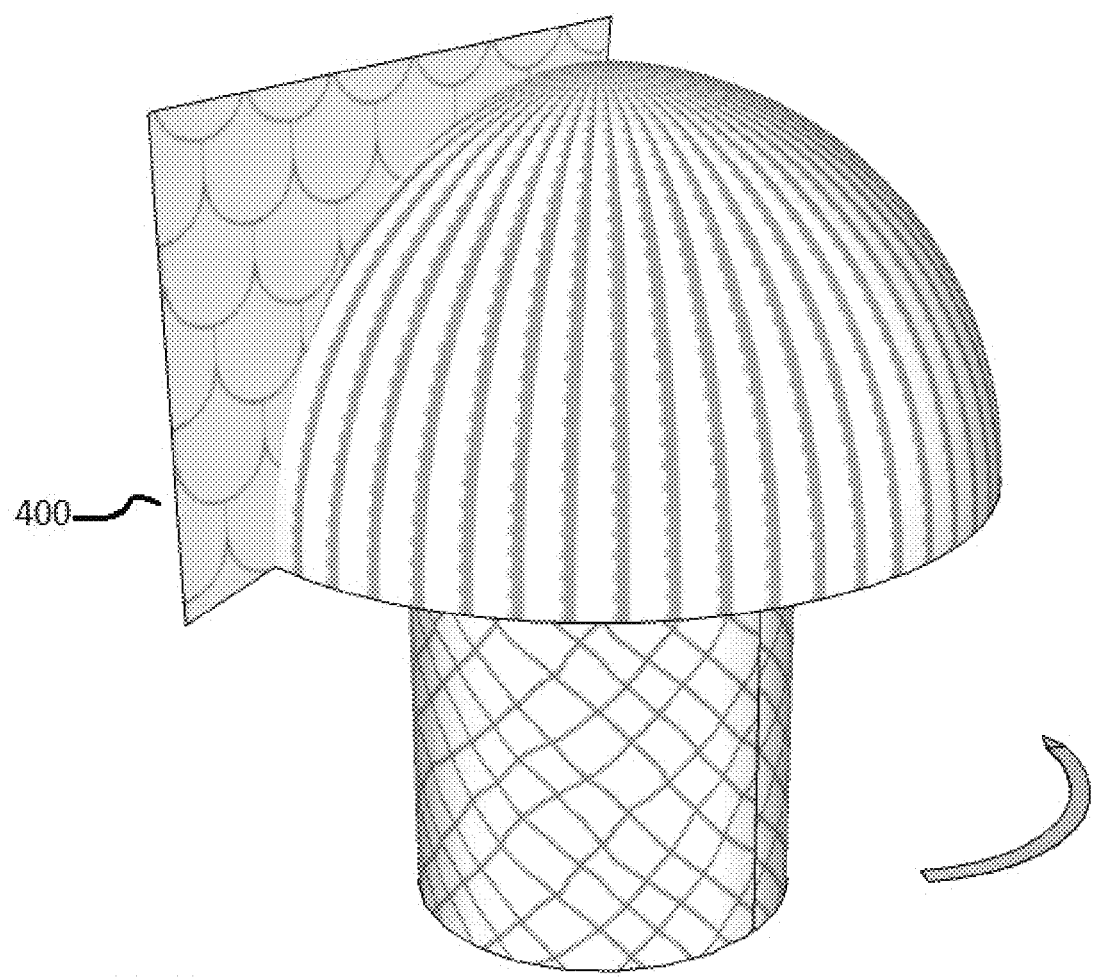
FIG. 2 is a perspective view of a pad of micro porous silicone rubber rubbing the hemisphere.

Referring to FIG. 2, a pillow of microphorous silicone rubber 400 is smearing a droplet of organic solvent. In the preferred embodiment, the hemisphere is made of plastic and the organic solvent is smeared until a layer of dissolved plastic is produced. The mandrel and hemisphere are in rotation during this process.

Figure 3:
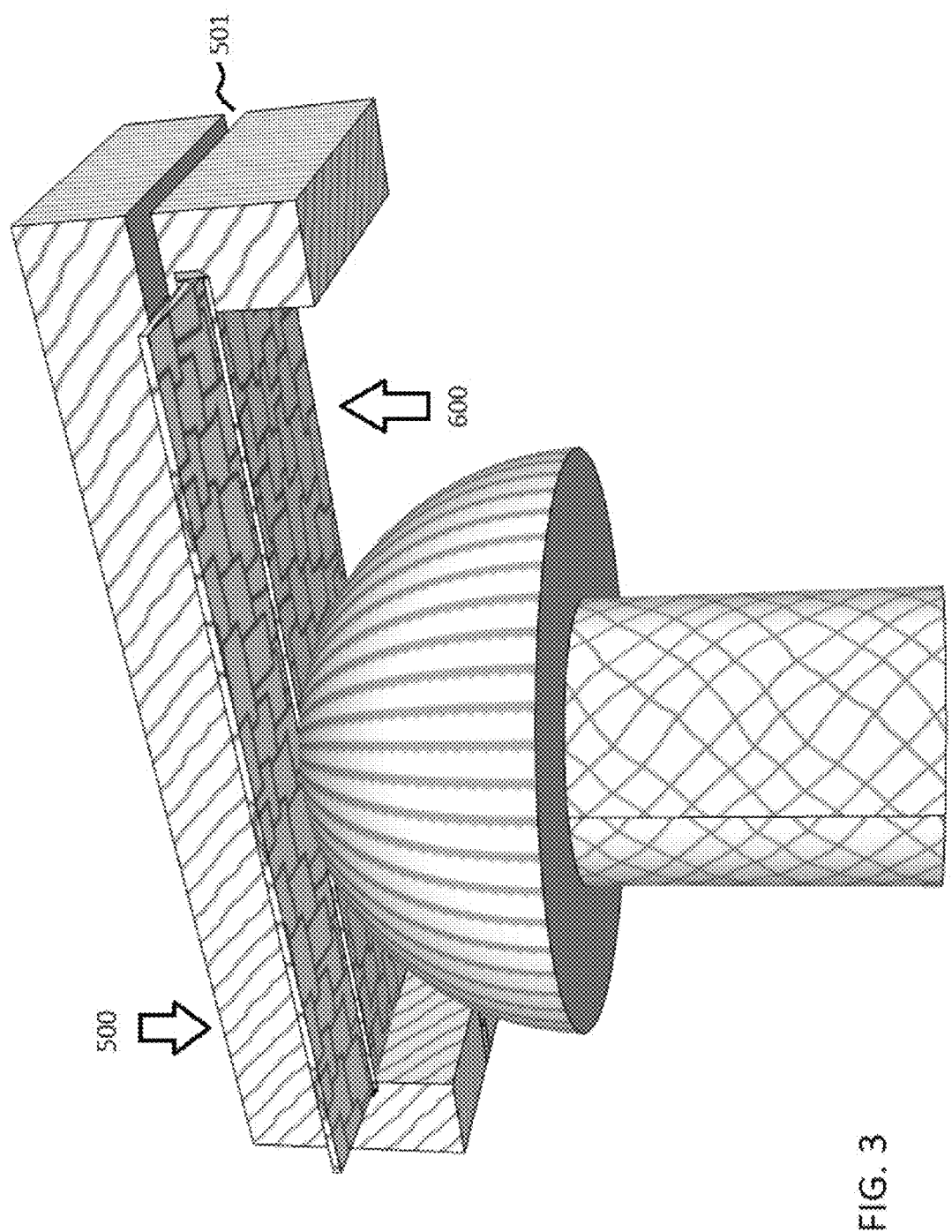
FIG. 3 is perspective and sectional view of an application chamber over a hemisphere.

Referring to FIG. 3, a stationary hemisphere is supported by a stationary mandrel while a sheet of reflective foil 600 is set within an application chamber 500. A void 501 within the application chamber allows for the introduction of pressurized gas. Heat from the application chamber 500 softens the reflective foil 600.

Figure 4:
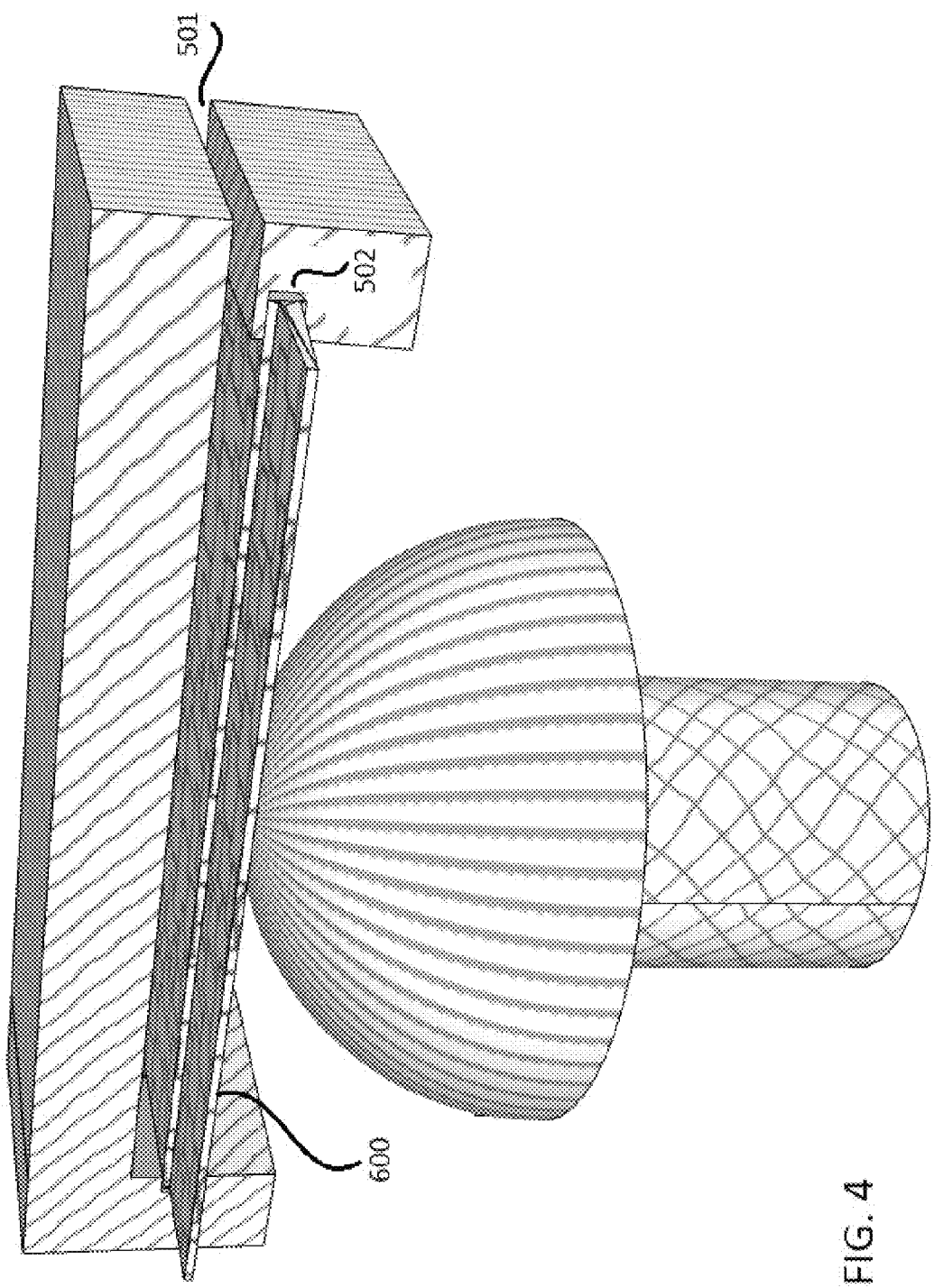
FIG. 4 is a perspective view of a sheet of reflective material placed within an application chamber.

FIG. 4 presents a perspective view looking down upon the reflective foil 600 and a partial view of a lower frame member 502, used to support the reflective foil.

Figure 5:
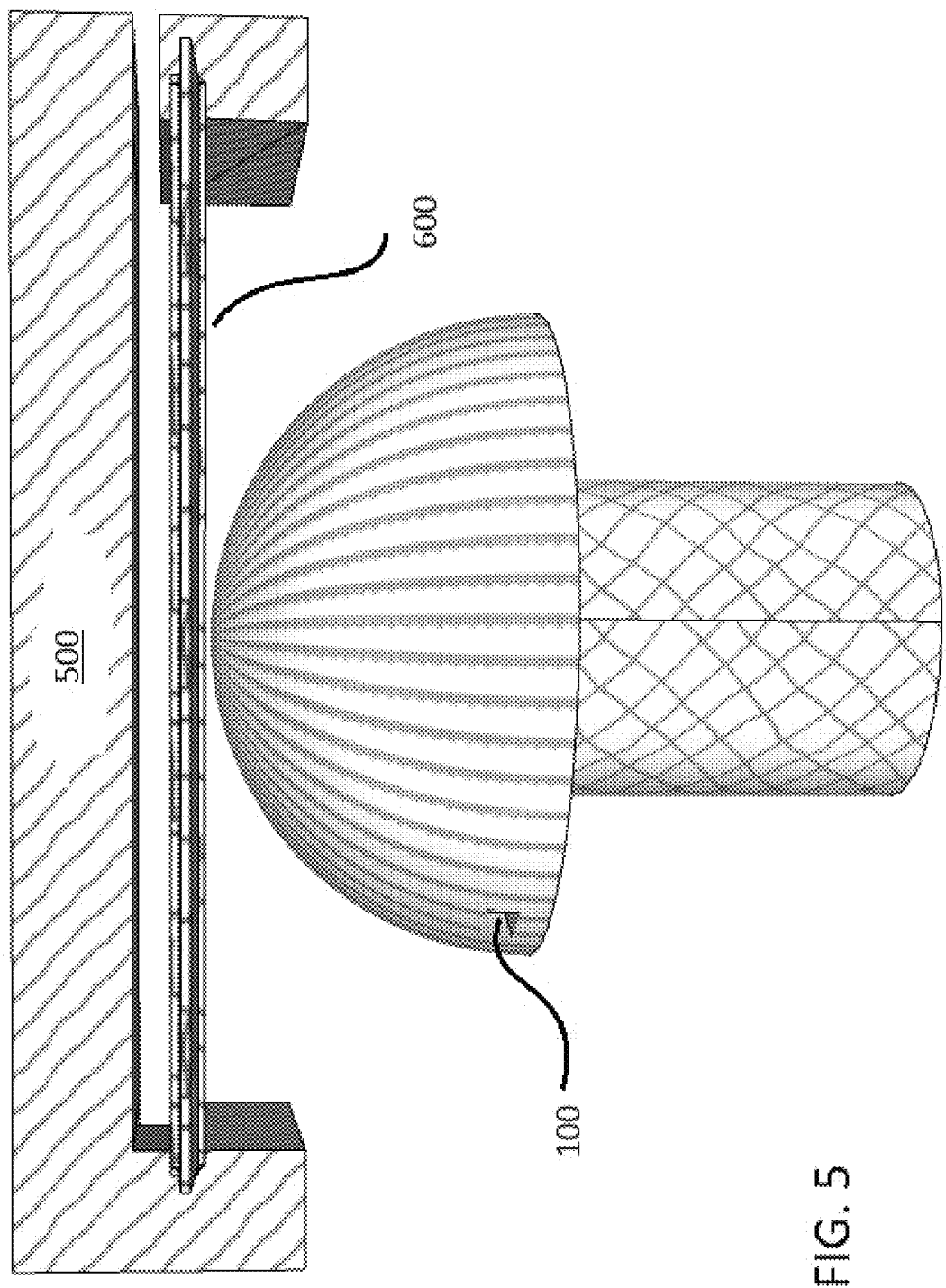
FIG. 5 is front view of a sheet of reflective material placed over a hemisphere.

FIG. 5 presents an elevation view of a reflective foil 600 in position to be applied to a hemisphere. The reflective foil is heated until softened and secured between a lower frame member and the application chamber. Pressurized gas enters the application chamber blowing the softened foil upon the hemisphere and encasing the hemisphere with a very smooth and evenly applied sheet of reflective foil. Excess foil is trimmed from the bottom portions of the hemisphere.

Figure 6:
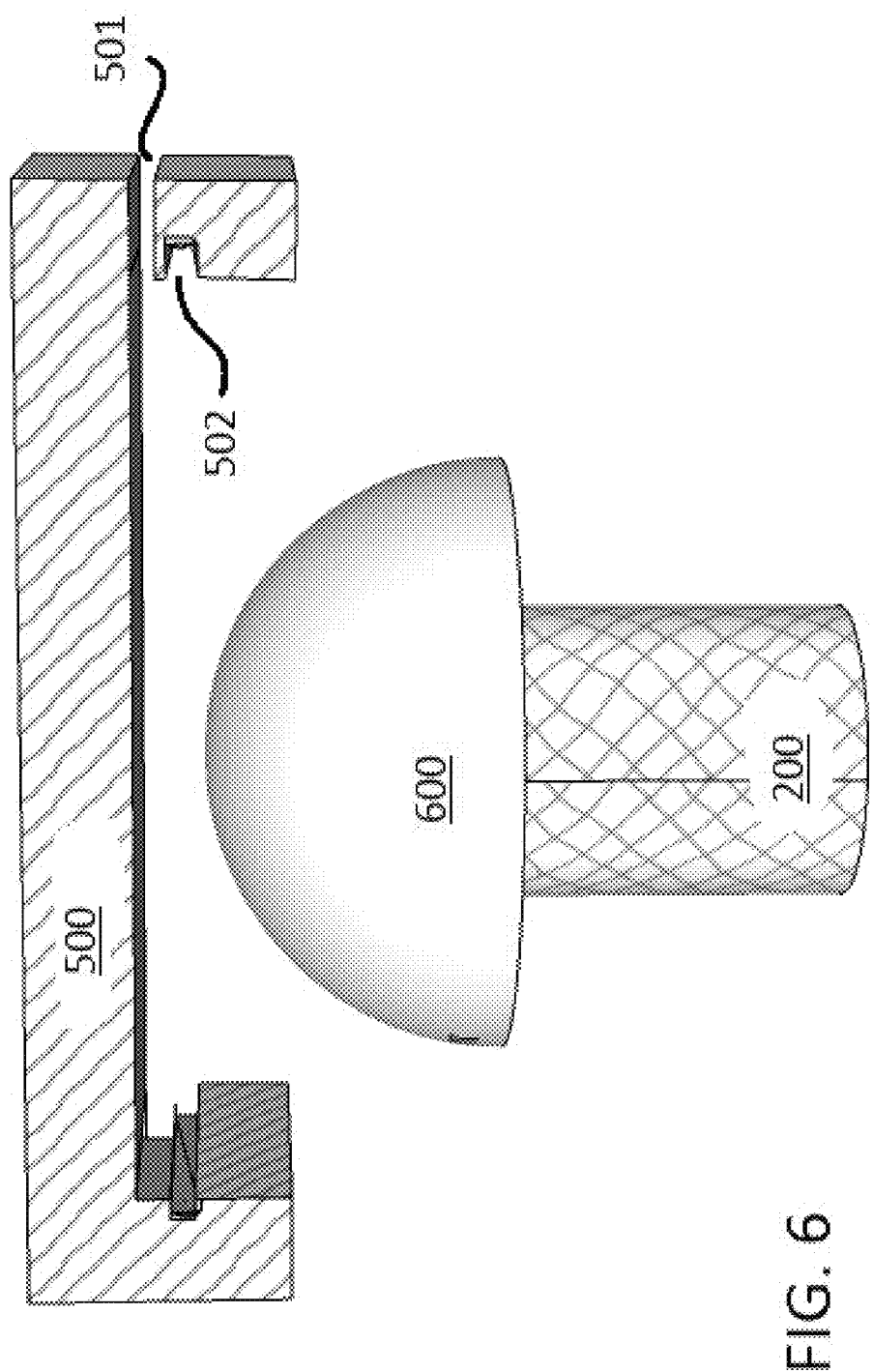
FIG. 6 shows the sheet of reflective foil smoothly applied to the surface of the hemisphere.

FIG. 6 shows a sheet of reflective foil 600 attached to a hemisphere and shows an application chamber without reflective foil. For purposes of this figure, the hemisphere is drawn with a smooth surface to emphasize the seamless nature of the foil to hemisphere attachment.

Figure 7:
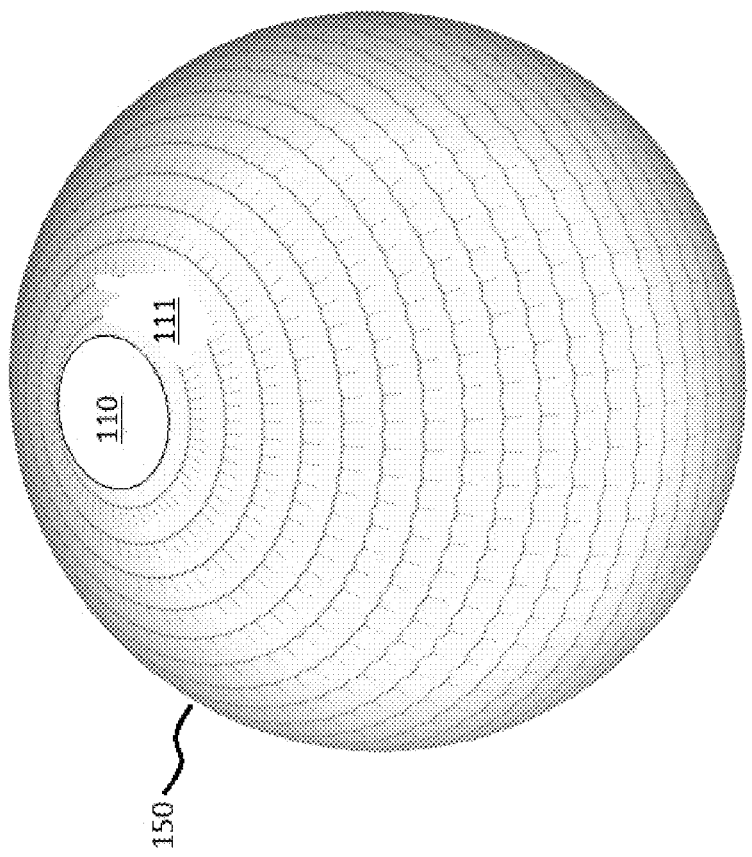
FIG. 7 is a perspective view of a finished marker comprising two attached hemispheres.

FIG. 7 is a perspective view of an embodiment of a finished sphere marker 150. In one embodiment a sphere marker may have an opening void 110, sometimes shown exiting through an upper or right hand hemisphere. The designation of right and left, top and bottom are arbitrary designations used for ease of reference, and in no way limit or constrain the scope of the claimed embodiments. Referring to FIG. 7, a top collar section 111 is shown as a concentric circle section around the center void 110. Top collar section 111 can also be seen in FIG. 8. Top collar section 111 is a feature of snap pin 112, (shown in FIG. 8) sometimes used to attach two hemispheres together.

Figure 8:
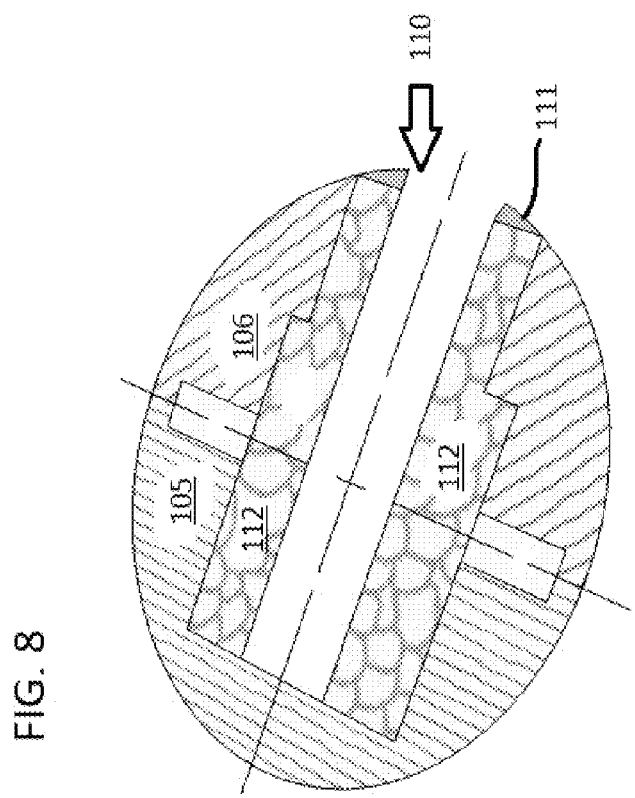
FIG. 8 is a sectional view of a completed marker comprising a snap pin and other features.

FIG. 8 is a sectional view of a completed marker sphere and shows a bottom or left hand side hemisphere 105, a top, or right hand side hemisphere 106. The two hemispheres are attached by use of a clip pin 112. The exposed surface 113 of the clip pin is drawn as a smooth surface, but is sometimes treaded, to allow for attachment of items to the sphere marker.

In one embodiment, all hemispheres start out as identical and are constructed of plastic. To achieve the greatest uniformity, the hemispheres are coated with foil prior to being drilled. After foil treatment, one hemisphere is drilled to create a void to accept a snap pin or other fastener. The disclosed configuration of hemispheres, voids and snap pins achieves excellent results in terms of maintaining a true center of gravity and in maintaining the structural integrity of the finished sphere. In the known related art, the geometry of the sphere or reflective coatings tend to stretch or otherwise distort, causing pain and less accurate navigation. The present invention represents a great improvement from the known prior art as the disclosed heated and blown foil process results in non-stretched foil and spheres.

In one embodiment, the organic solvent leaves a very slippery layer upon a hemisphere after rubbing, shown in FIG. 2. The slippery nature of the hemisphere is short lived, and thus a treated hemisphere is quickly moved to an application chamber, where a reflective foil is subjected to high gas pressure, causing the foil to deform and encase the hemisphere. The surface of the hemisphere is still slippery from the organic solvent, thus allowing the heated foil to spread evenly and uniformly over the hemisphere. Soon after contact with the foil, the organic solvent ceases to be slippery and quickly glues the foil in place. In the best mode known to date, the foil to hemisphere process takes approximately one second.

The embodiments are preferably made with construction tolerances of less than 0.02 mm such that the gap, if any between two hemispheres is less than 0.02 mm and that the geometry of a finished sphere has an accuracy of +/−0.02 mm. The precision of the snap pin or base has a deviation of less than +/−0.01 mm. In the best mode known to date, the hemispheres are coated with 3M 8710 reflective foil.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Embodiments of the invention include, but are not limited to the following items which may be used to breathe life into the claims or otherwise help to define terms used within the claims.

Items

Item 1. A method of attaching a reflective foil to a hemisphere, the method comprising:
a) attaching a hemisphere 100 to a rotating support, such as a mandrel 200;
b) rotating the hemisphere;
c) applying a quantity of between 1 to 3 drops of organic solvent 300 to the hemisphere;
d) rubbing the organic solvent to the hemisphere using a pad of microphorous silicone rubber and continuing such rubbing until the hemisphere achieves a lower coefficient of friction as compared to the hemisphere's condition prior to rubbing;
e) placing the hemisphere under an foil marker application device;
f) using hot gas under pressure to heat and soften the marking foil material and to blow the marking foil material off of the application device and to deform the foil to fit upon the hemisphere.

Item 2. The method of item 1 further comprising the steps of using a plastic hemisphere and rubbing the plastic hemisphere with the organic until a slippery layer of degraded plastic covers the hemisphere.

Item 3. The method of item 2 used to create a marker sphere 150, the further steps comprising:
a) trimming off any excess marking foil;
b) obtaining two hemispheres with that have undergone the process described above;
c) creating a relatively large void within a hemisphere designated as a bottom hemisphere, with the void being of sufficient diameter to accept clip;
d) creating a relatively smaller void section with a hemisphere designated as a top hemisphere;
e) securing the bottom and top hemispheres to together by us of a snap pin, with the snap pin held in compression while inserted through the top hemisphere and expanding within the bottom hemisphere and thus rigidly attaching the upper hemisphere to the lower hemisphere.

Item 4. A reflective marker, the marker comprising:
a) two hemispheres, rubbed with organic solvent by use of a pillow of microporous silicone rubber until the surface of the hemispheres have a lower coefficient of friction;
b) each hemisphere having a reflective coating comprising reflective foil applied to the hemispheres by use of hot and compressed gas used to soften, deform and transport the reflective foil to a hemisphere;
c) the hemispheres being trimmed of any excess reflective foil;
d) the two hemispheres having asymmetric voids such that a bottom hemisphere has a larger void and a top hemisphere has a more narrow void;
e) a snap pin, attaching the hemispheres by use of the hemisphere's asymmetric voids; and
f) the snap pin having a center void;

Item 5. The reflective marker of item 4 wherein the snap pin has a top collar section located concentrically from the center void of the snap pin, with the top collar section being relatively flush with the outer surface of the reflective marker.

What is claimed is:

1. A method of attaching a reflective foil to a hemisphere, the method comprising:
a) attaching a hemisphere to a rotating support, such as a mandrel;
b) rotating the hemisphere;
c) applying a quantity of between 1 to 3 drops of organic solvent to the hemisphere;
d) rubbing the organic solvent upon the hemisphere using a pad of microphorous silicone rubber and continuing such rubbing until the hemisphere achieves a lower coefficient of friction as compared to the hemisphere's condition prior to rubbing;
e) placing the hemisphere under an foil marker application device; and
f) using hot gas under pressure to heat and soften a marking foil material and to blow the marking foil material off of the application device and to deform the marking foil material to fit upon the hemisphere.

2. The method of claim 1 wherein the hemisphere is made of plastic and including the step of rubbing the plastic hemisphere with the organic solvent until a slippery layer of degraded plastic covers the plastic hemisphere.

3. The method of claim 2 further comprising the steps of:
a) treating a bottom plastic hemisphere and a top plastic hemisphere by use of the steps described above;
b) creating a relatively large void within the bottom plastic hemisphere, with the void being of sufficient diameter to accept a clip;
c) creating a relatively smaller void section within the top plastic hemisphere; and
d) securing the bottom and top plastic hemispheres together by us of a snap pin, with the snap pin held in compression while inserted through the top plastic hemisphere and expanding within the bottom plastic hemisphere and thus rigidly attaching the upper plastic hemisphere to the lower plastic hemisphere.

4. A reflective marker comprising:
a) top hemispheres and a bottom hemisphere, the two hemispheres each rubbed with an organic solvent by use of a pillow of microporous silicone rubber until the surface of the two hemispheres have a lower coefficient of friction;
b) each of the two hemispheres having a reflective coating comprising a reflective foil applied to the two hemispheres by use of hot and compressed gas used to soften, deform and transport the reflective foil to the two hemispheres;
c) the two hemispheres being trimmed of any excess reflective foil;
d) the two hemispheres having asymmetric voids such that the bottom hemisphere has a larger void and the top hemisphere has a more narrow void;
e) a snap pin, attaching the two hemispheres by use of the two hemispheres, asymmetric voids; and
f) the snap pin having a center void.

5. The reflective marker of claim 4, wherein the snap pin has a top collar section located concentrically from the center void of the snap pin, with the top collar section being relatively flush with the outer surface of the reflective marker.

\* \* \* \* \*